UNITED STATES PATENT OFFICE.

JOHN CARNRICK, OF NEW YORK, N. Y.

PROTONUCLEIN AND METHOD OF PREPARING SAME.

SPECIFICATION forming part of Letters Patent No. 587,278, dated July 27, 1897.

Application filed January 4, 1895. Serial No. 533,839. (No specimens.)

*To all whom it may concern:*

Be it known that I, JOHN CARNRICK, a citizen of the United States, residing at New York city, in the county and State of New York, have invented certain new and useful Improvements in Nutritive and Antitoxic Preparations; and I do hereby declare the following to be a full, clear, and exact description of the invention, such as will enable others skilled in the art to which it appertains to make and use the same.

This invention relates to a nutritive and antitoxic preparation adapted more particularly for stimulating assimilative and nutritive action in the formation of bodily tissue and for destroying poisonous germs and ptomaines which produce various zymotic diseases.

The object of my invention is to provide a nutritive or tissue-building composition containing nuclein from different portions of the animal organism, adapted for restoring the vitality of all the tissues of the human organism by aiding and supporting assimilative nutrition and also for destroying toxic germs and preventing infectious and zymotic diseases—such as diphtheria, typhoid fever, scarlet fever, cholera infantum, tuberculosis, malaria, and other diseases produced by toxic germs.

One of the special objects of my invention is to prepare nuclein from the different organs and parts of the animal in a perfectly natural condition without the use of deteriorating chemical agents and so as to preserve the cellular activity and function of the nuclein. After the nuclein has been prepared from the lymphoid structures of the body, preferably in a dry powdered state, its cellular activity is preserved by investment or coating of the finely-divided particles or grains with a solution of a suitable gum, as benzoin.

It has been ascertained by comparatively recent investigation and tests that nuclein is the physical basis of all vital action of tissue growth and development. Nuclein is a granular substance produced by cell action from the proteids of the circulation and is the product of the multinuclear white blood-corpuscles or leucocytes. Its chemical furmula is $C_{29}H_{49}N_9P_5O_{32}$. When nuclein is formed in the blood, it is the result of the action upon proteids by the leucocyte. When nuclein is introduced (through the mouth and stomach) into the organism, it acts in two ways. First, it immediately excites the osmotic action of each leucocyte, causing it to proliferate, which is leucocytosis, and also to break into nuclei, and the more active the leucocytosis the greater the vital resistance to toxic disease-germs; second, it furnishes ready made to the leucocyte material which, under a depressed vital condition, it is unable of itself to construct from the proteids, and thus lifts the organism to the normal physiological standard or state of perfect health, while it so strengthens and increases the leucocytes that they overpower the toxic germs with which they may come in contact. Every leucocyte, if in full physiological activity, has the power of taking up toxic germs and destroying their vitality. Anything, therefore, which excites the growth of leucocytes to that extent tends to eliminate disease from the organism.

Immediately upon the formation of nuclein in the leucocyte and while it remains within its walls it is the same wherever found, but when delivered up to the individual tissue-cell it takes at once the molecular impress of that cell, only that portion being appropriated which is necessary for the tissue-building purposes over which such cell presides. In this way we have nuclein modified by each cell. A combination of nuclein from the various tissues of the body produces my composition, which is termed "protonuclein," which is protected as a trade-mark by certificate of registration No. 25,787, issued to me.

My protonuclein composition is prepared from the thyroid and thymus glands, brain, (pineal glands and pituitary body,) bone-marrow, pancreas, spleen, liver, salivary glands, Brunner's glands, Lieberkühn's follicles, and peptic glands. In the preparation of nuclein from the above-mentioned glandular bodies care is taken to preserve the free leucocytes, which are charged with basic nuclein.

Protonuclein is an exact physiological product derived directly from the lymphoid structures of the body without the use of chemical agents. It is the simple dried and preserved cellular nuclein elements of the organism. So delicate is protonuclein that any chemical agent is liable to disturb its cellular activity.

The process of preparing protonuclein is preferably conducted as follows: The thyroid and thymus glands, brain, bone-marrow, pancreas, spleen, liver, salivary glands, Brunner's glands, Lieberkühn's follicles, and peptic glands should be removed as soon as possible after the animal has been slaughtered, and then the lymphoid tissues, which contain the largest amount of nuclein, are carefully dissected from the coarser fleshy or muscular tissues and fat, which are rejected, the glandular organs being at the same time kept in a neutral condition. The lymphoid tissues thus obtained are thoroughly dried at a temperature below that which would coagulate the albuminous matter, preferably 100° Fahrenheit to 110° Fahrenheit and not exceeding 130° Fahrenheit, and then reduced to a coarse powder. This powder may be treated with ether or other suitable solvent to remove the fat, after which the powder is again dried, preferably at a temperature of 100° Fahrenheit to 110° Fahrenheit and not exceeding 130° Fahrenheit, and is then reduced to a fine powder. The cells containing the nuclein, being dry, hard, and brittle, are readily powdered, while the epidermal tissue or skin and some muscular fiber remain in the form of thin scales or films which are readily separated by a sieve. A sieve with a moderately-fine mesh is used. The fine powder contains the nuclein-cells of all the organs which have been treated.

In order to preserve the cellular activity of nuclein prepared as above described, the powder is treated with a dilute ethereal solution of a suitable gum, as benzoin, so as to invest the finely-divided particles or granules with a protective coating. The benzoin is inert, so that it does not affect the nuclein except to preserve it. The benzoinized powder is then spread out and allowed to dry and the odor of ether thus expelled. The prepared powder may then be mixed with milk-sugar in suitable proportion and formed into tablets or put up in powdered condition, or it may be treated with glycerin and other solvents and made into a solution and used as occasion requires.

The powdered nuclein of the different glands are preferably mixed in such proportion as they are obtained from each organ—that is, the yield of ten or one hundred of each of the glands are mixed together and then mixed with a suitable proportion of milk-sugar. The milk-sugar assists in preserving the nuclein and maintaining its cellular activity and vitalizing functions in unimpaired condition.

Nuclein obtained from each of the above-mentioned organs differs materially in its nutritive and tissue-building properties, and a mixture as above indicated is found most useful in causing healthy assimilation and repair and growth of the different structures of the human organism. Nuclein also possesses peculiar properties in destroying toxic germs. A mixture of nuclein prepared from the different above-mentioned sources is therefore most effective in combating disease-germs and poisonous ptomaines and in acting as an efficient tissue-builder.

Since protonuclein rapidly restores the vitality of all the tissues by aiding and supporting assimilative nutrition, it may be administered with advantage in cases of neurasthenia, exhaustion from business care, wasting diseases, pernicious anemia, marasmus, and general weakness, all conditions in which the organism is below the normal physiological standard.

As an antitoxic agent it should be administered in all diseases depending upon a toxic germ, especially in diphtheria, typhoid fever, scarlet fever, cholera infantum, dyspepsia, tuberculosis, &c. If administered to persons who are subjected to infectious diseases, it will act as a reliable preventive, either granting absolute immunity from the disease or so modifying the attack of the disease as to destroy its virulence.

Protonuclein may also be administered with advantage in place of what are known as "culture of disease germs," which are now often injected into the circulation to combat other disease-germs already in the system. It will accomplish the same end and be more acceptable to the organism, free from the danger of introducing additional poisonous elements, which frequently lead to fatal results. Nuclein or protonuclein may be taken into the organism directly through the natural channels, as digestive agents do not affect it, or it may be introduced directly into the circulation by hypodermic injection.

Having described my invention, what I claim, and desire to secure by Letters Patent, is—

1. The above-described protonuclein composition containing cellular nuclein possessing its normal cellular activity, having nutritive and antitoxic properties, and in dry, powdered form, capable of preservation, substantially as described.

2. The above-described protonuclein composition containing cellular nuclein, derived from different glands and organs of the animal organism, possessing its normal cellular activity, having nutritive and antitoxic properties, and in dry, powdered form, capable of preservation, substantially as described.

3. A nutritive and antitoxic preparation containing the cellular elements of nuclein, possessing its normal cellular activity, in a dry powdered form, the particles or granules of which are coated or invested with a suitable gum, as benzoin, for preserving it.

4. As an article of manufacture a nutritive and antitoxic preparation containing cellular nuclein in dry powdered form, capable of preservation, and milk-sugar.

5. A nutritive and antitoxic preparation containing cellular nuclein in dry powdered form, the particles or granules being coated with a suitable gum, for preserving its cellular activity, and milk-sugar.

6. The process of preparing a nutritive and antitoxic substance containing nuclein from different animal organs which consists in dissecting the lymphoid tissue containing the largest percentage of nuclein from the muscular and other coarse tissues, drying the lymphoid tissues at a temperature below that which would coagulate the albuminous matter, then reducing it to a powder and separating the nuclein cellular matter from the scaly and fibrous matter, as by sieving.

7. The process of preparing a nutritive and antitoxic substance containing nuclein from different animal organs which consists in dissecting the lymphoid tissues containing the largest percentage of nuclein from the muscular and other coarse tissues, drying the lymphoid tissues at a comparatively low temperature, not exceeding 130° Fahrenheit, then reducing it to a powder and separating the nuclein cellular matter from the scaly fibrous matter by sieving or other means, then treating the nuclein cellular powder with a solution of a suitable gum, as benzoin for protecting and preserving it as described.

In testimony whereof I affix my signature in presence of two witnesses.

JOHN CARNRICK.

Witnesses:
ALLEN CHAMBERLIN,
G. KOENIG.